United States Patent
Nixon et al.

(10) Patent No.: US 6,508,492 B2
(45) Date of Patent: Jan. 21, 2003

(54) SWIVELING HOSE COUPLING

(75) Inventors: Laurence Nixon, Port Hueneme, CA (US); Martin Fickel, Oxnard, CA (US); Benjamin Shelpuk, Evergreen, CO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 38 days.

(21) Appl. No.: 09/804,342

(22) Filed: Mar. 12, 2001

(65) Prior Publication Data

US 2002/0125720 A1 Sep. 12, 2002

(51) Int. Cl.[7] .................................................. F16L 27/00
(52) U.S. Cl. ........................ 285/281; 285/367; 285/411; 285/280; 285/281
(58) Field of Search ................................ 285/364–367, 285/272, 278, 280, 281, 121.5, 406, 411

(56) References Cited

U.S. PATENT DOCUMENTS

| 3,756,629 | A | * | 9/1973 | Gibb | 228/189 |
|---|---|---|---|---|---|
| 4,289,336 | A | * | 9/1981 | Bajeux | 285/121.5 |
| 4,418,947 | A | * | 12/1983 | Talafuse | 192/45 |
| 4,471,979 | A | * | 9/1984 | Gibb et al. | 285/112 |
| 4,699,405 | A | * | 10/1987 | Miller | 285/232 |
| 5,351,999 | A | * | 10/1994 | Hattori | 285/369 |
| 5,505,503 | A | * | 4/1996 | Boivin | 285/112 |
| 5,658,021 | A | * | 8/1997 | Matsumoto et al. | 285/112 |
| 5,743,576 | A | * | 4/1998 | Schron et al. | 294/1.1 |

FOREIGN PATENT DOCUMENTS

| EP | 0446548 A1 | * | 9/1991 |
|---|---|---|---|
| JP | 52008520 A | * | 1/1977 |

* cited by examiner

Primary Examiner—Lynne H. Browne
Assistant Examiner—Aaron Dunwoody
(74) Attorney, Agent, or Firm—David Kalmbaugh

(57) ABSTRACT

A swiveling hose coupling comprising first and second nipples and a cylindrical shell. The cylindrical shell includes a swivel shell, and first and second retaining rings. The swivel shell is set between the first and second retaining rings. The first and second nipples are in proximity with one another within the cylindrical shell, but are separated by antifriction bearings. The first and second nipple rotate independent of one another to prevent inhibition of liquid flow in a hose coupled to the swiveling hose coupling. The first and second nipples are set in the cylindrical shell, using journal bearing grooves on the first and second nipple, in which the journal bearing grooves abut the first and second retaining rings. Reference points for the application of a hose coupling clamp are provided by an indexing ring on each of the nipples.

13 Claims, 9 Drawing Sheets

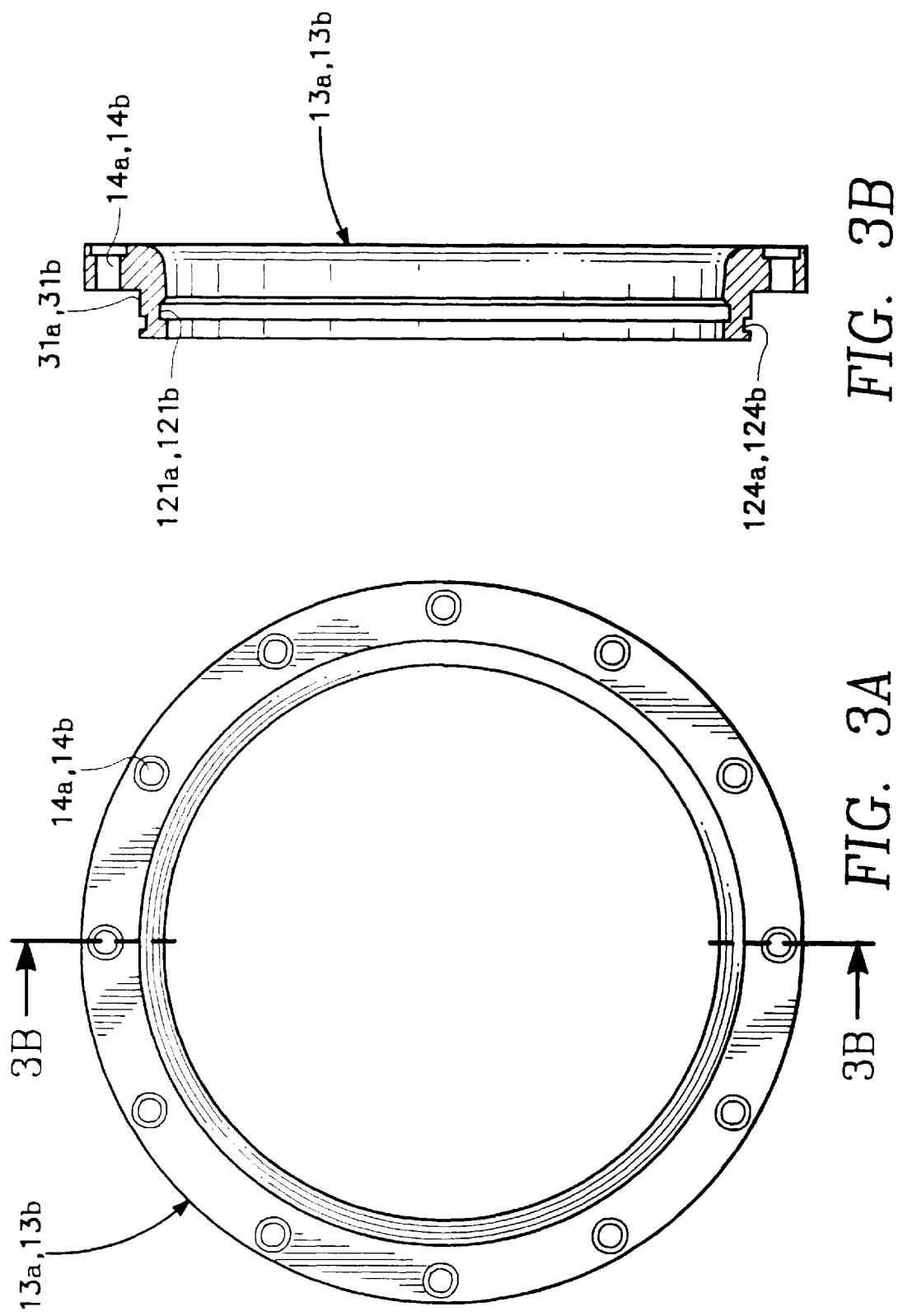

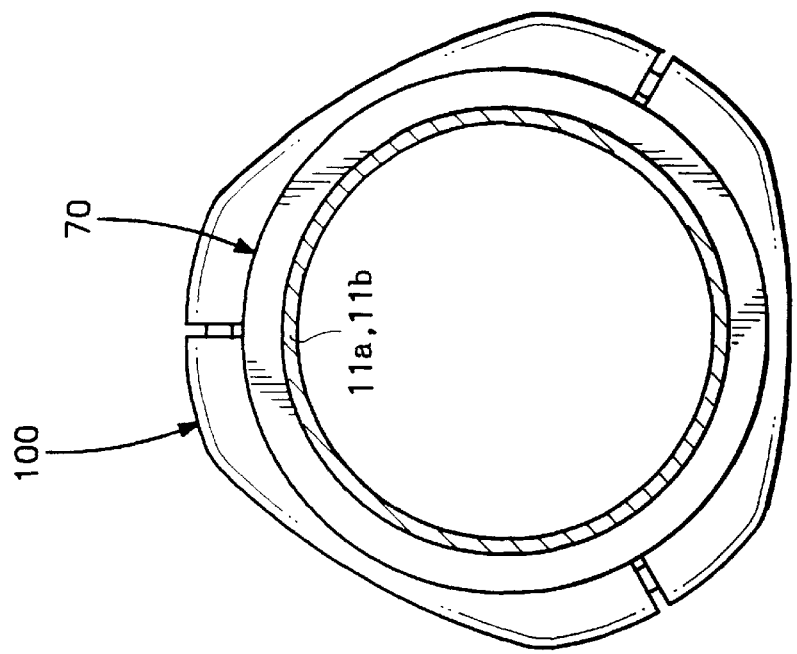
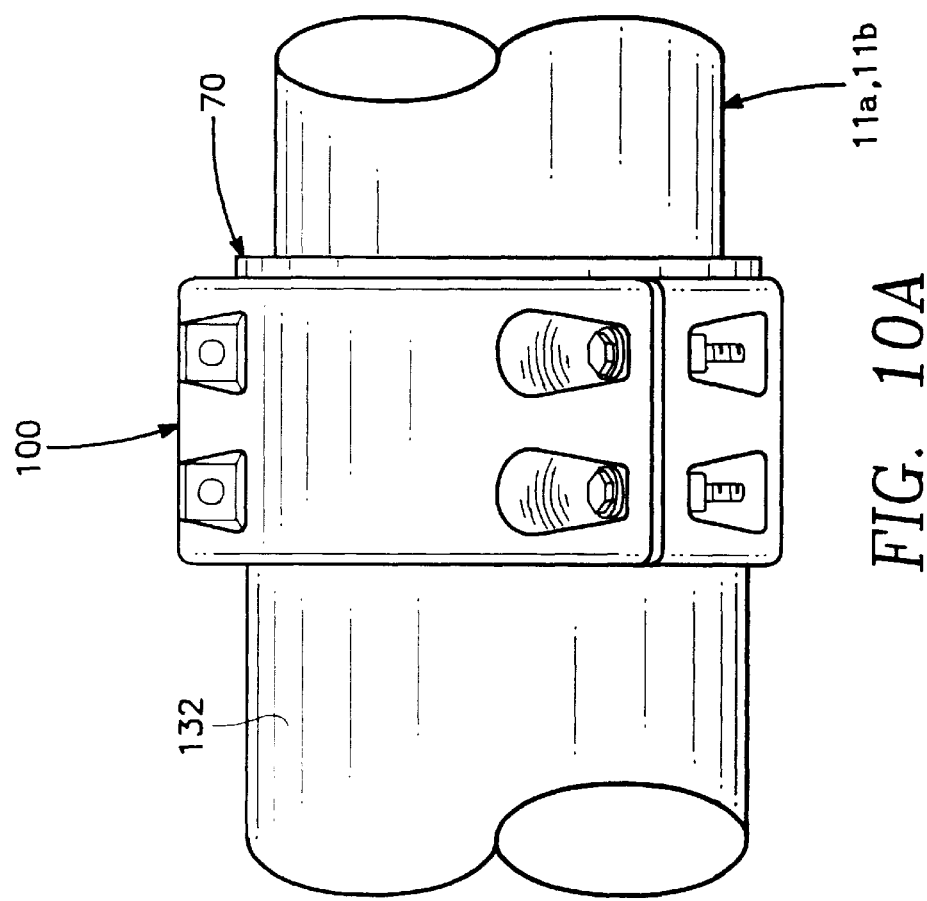
FIG. 10B
FIG. 10A

SWIVELING HOSE COUPLING

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

This invention relates to a buoyant hose coupling and more particularly to a coupling for use with flexible hose or tubing. More specifically, this invention relates to a buoyant hose coupling which is equipped to swivel to prevent the hose from becoming twisted.

2. Description of the Prior Art

It is a common practice to utilize hose clamps and the like for coupling and securing relatively thick-walled rubber hoses and the like. The hose clamp can be tightened into the rubber hose wherein, by means of sufficient pressure, the hose clamp will exert sufficient force on the hose, deforming the same, to create a tight seal between the hose and the article to which it is clamped. Essentially, it is the inner resilience of the hose against the nipple to which it is pressed which performs the sealing.

U.S. Pat. No. 5,306,051 (hereinafter "'051 Patent") issued to Lokar et al. on Apr. 26, 1994 discloses a self-tightening hose coupling. However, the hose coupling disclosed in the '051 Patent does not provide a self-aligning mechanism to prevent a hose from twisting.

U.S. Pat. No. 4,593,942 (hereinafter "'942 Patent") issued to Lokar on Jun. 10, 1986 discloses a hose coupling. However, the hose coupling disclosed in the '051 Patent does not provide a self-aligning mechanism to prevent a hose from twisting.

SUMMARY OF THE INVENTION

It is an object of the instant invention to provide a coupling, which produces a good seal between the tubing and the article to which it is attached.

Another object of the instant invention is to provide reusable couplings, which can be recoupled in the field and can be assembled with no special tools.

Still another object of the instant invention is to provide a coupling, which can withstand relatively high pressures compared to its size.

A further object of the instant invention is to provide a lightweight swivel, which will allow a hose to roll out twists and kinks caused by storage or the wave action of a body of water.

Yet another object of the instant invention is to provide a buoyant coupling, which will rotate to prevent misalignment between connected hose segments.

A further object of the instant invention is to provide a buoyant coupling, which will provide for the ultimate capabilities of the hose, i.e., the maximum theoretical strength of the hose.

A further object of the instant invention is to provide means for coupling lengths of hose/tubing together, which can withstand relatively high pressures with extreme longitudinal pull, such as encountered in conveying such diverse fluids as drinking water, fuel, oil or the like from off-shore vessels to installations or facilities on-shore without leakage and/or contamination of the environment.

The swivel hose coupling of the present invention consists of a cylindrical shell assembly with cylindrical nipple assemblies that rotate within the shell. The nipple assemblies, a first nipple and a second nipple, are designed to rotate independent of one another to prevent inhibition of liquid flow in the hose. The nipple assemblies are in proximity with one another, but separated by antifriction bearings composed of a high friction compound such as TEFLON®. The antifriction bearings are used to reduce the force required to rotate the nipples within the shell. Fluid seals are used to keep fluids from leaking out of the hose line. The fluid seals are designed for relative motion between the sealing surfaces on the shell and the nipples. Debris seals are on the outer ends of the housing to prevent dirt, grit or other contaminants from entering the bearing areas.

BRIEF DESCRIPTION OF THE DRAWINGS

The above and other objects and advantages of the invention will be appreciated from the following description and accompanying drawings, wherein:

FIG. 3A is an end view of the retaining ring of the swiveling hose coupling of a preferred embodiment of the present invention;

FIG. 3B is a side view of a cross section of the retaining ring of the swiveling hose coupling of a preferred embodiment of the present invention taken along line 3B—3B of FIG. 3A, which illustrates the design of the retaining ring;

FIG. 10A is a side view of a clamp that may be used in conjunction with the swiveling hose coupling of a preferred embodiment of the present invention; and FIG. 10B is an end view of a clamp that may be used in conjunction with the swiveling hose coupling of a preferred embodiment of the present invention.

DETAILED DESCRIPTION OF THE INVENTION

Figure 1A:
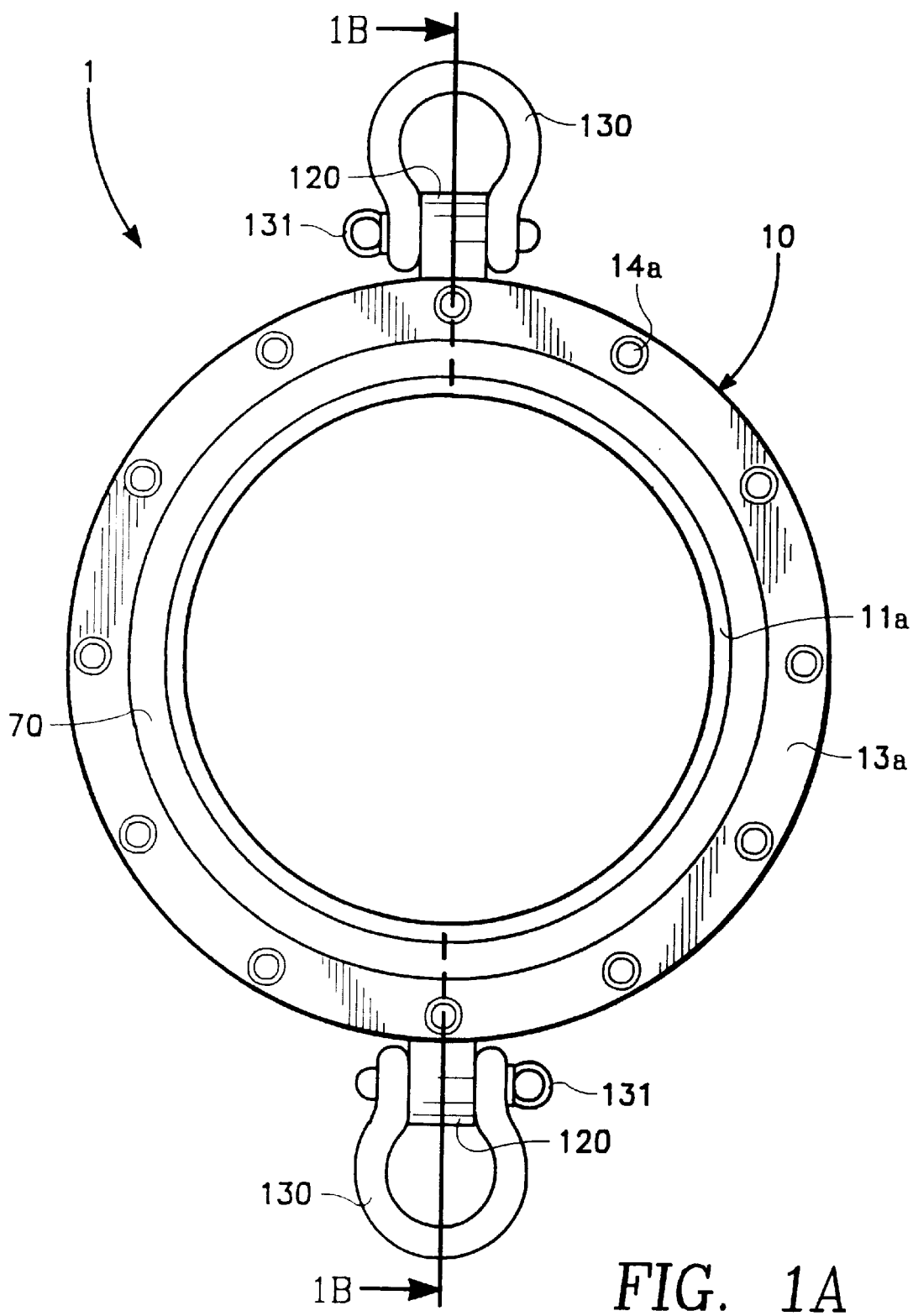
FIG. 1A is a end view of the swiveling hose coupling of a preferred embodiment of the present invention which illustrates the cylindrical shape of the cylindrical shell and nipple assemblies.

Referring to FIGS. 1A through 4B, the swivel hose coupling 1 of the present invention consists of a cylindrical shell assembly 10 with cylindrical nipple assemblies 11a and 11b that rotate within the shell 10. The cylindrical shell 10 is composed of three main sections, which are a swivel shell 12, a first retaining ring 13a and a second retaining ring 13b. The swivel shell 12 is set between the first and second retaining rings 13a and 13b. The swivel shell 12 is set between the retaining rings 13a and 13b by being secured over an inner flange 31a on retaining ring 13a and an inner flange 31b on retaining ring 13b, as illustrated in FIGS. 1B, 3A and 3B. In a preferred embodiment of the present invention, the respective outer circumferences of the swivel shell 12, first retaining ring and second retaining ring 13a and 13b are approximately equal. The swivel shell 12 is secured between the first and second retaining rings 13a and 13b by a plurality screw locks 14a and 14b inserted through each of the retaining rings 13a and 13b and into the swivel shell 12. However, other securing means may be used for securing the swivel shell 12. In a preferred embodiment of the present invention, the primary material used in the construction of the swiveling hose coupling is aluminum or any other lightweight durable material. In a more preferred embodiment of the present invention, the aluminum is anodized to prevent corrosion.

Referring to FIGS. 1A through 2B, the nipple assemblies, a first nipple 11a and a second nipple 11b, which are identical, are designed to rotate independent of one another to prevent inhibition of liquid flow in the hose 132 caused by twisting of the hose. The first nipple 11a and second nipple 11b are in proximity with one another within the cylindrical shell 10 (as shown in FIG. 1B), but do not contact one another (as shown in FIG. 1B). The first nipple 11a and second nipple 11b are separated from the cylindrical shell 10 by antifriction bearings composed of a high antifriction compound such as TEFLON®. The antifriction bearings are used to reduce the force required to rotate the nipples within the shell.

Figure 1B:
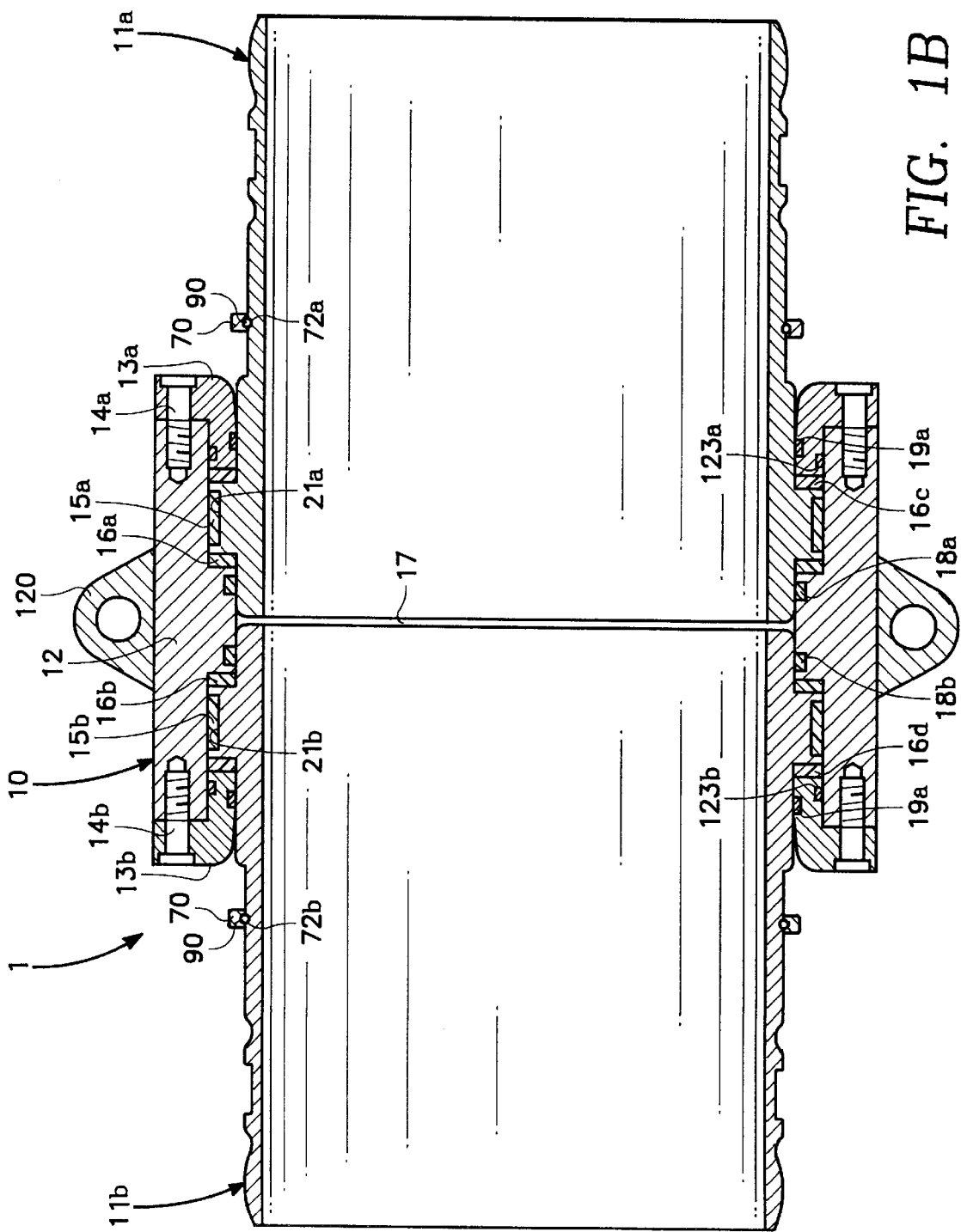
FIG. 1B is a side view of a cross section of the swiveling hose coupling of a preferred embodiment of the present invention taken along line 1B—1B of FIG. 1A, which illustrates the interaction of the cylindrical shell and the nipple assemblies.
Figure 2B:
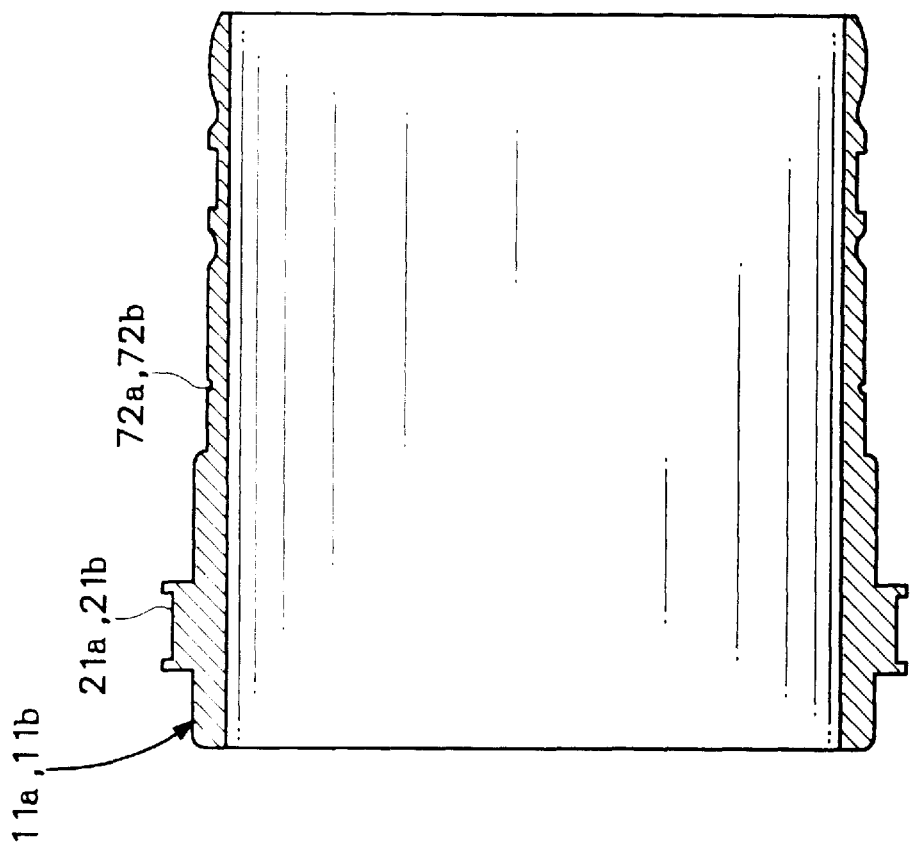
FIG. 2B is a side view of a cross section of the nipple assembly of FIG. 2A of a preferred embodiment of the present invention taken along line 2B—2B of FIG. 2A, which illustrates the design of the nipple assemblies.
Figure 2A:
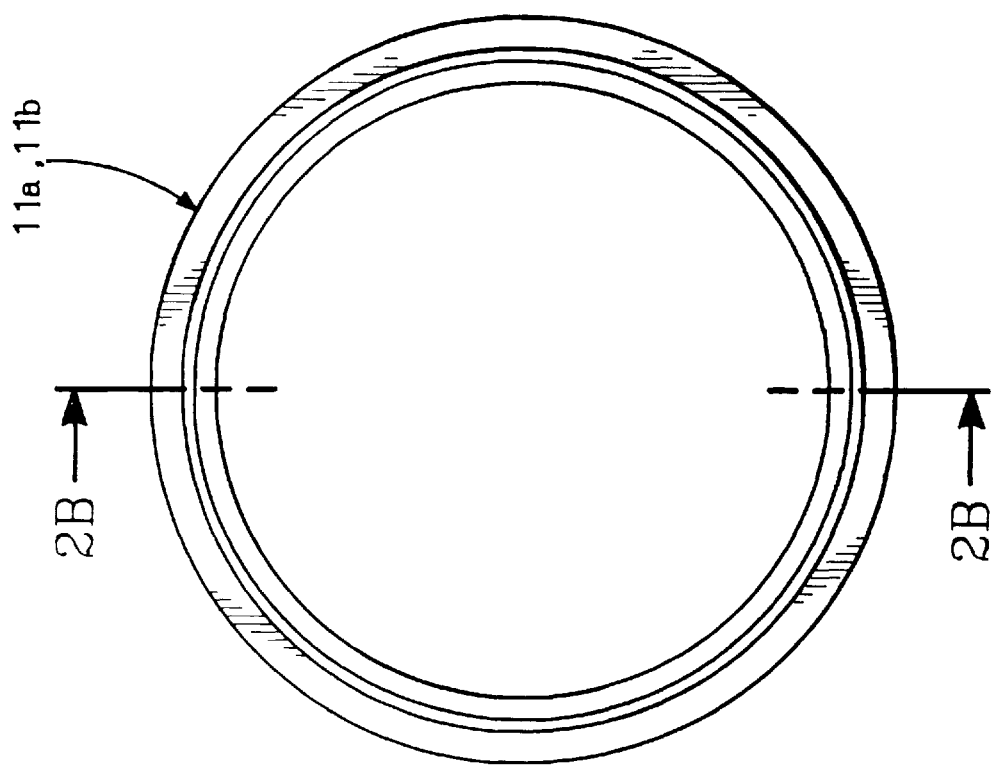
FIG. 2A is an end view a nipple assembly of pair of identical nipple assemblies of the swiveling hose coupling of a preferred embodiment of the present invention.
Figure 4B:
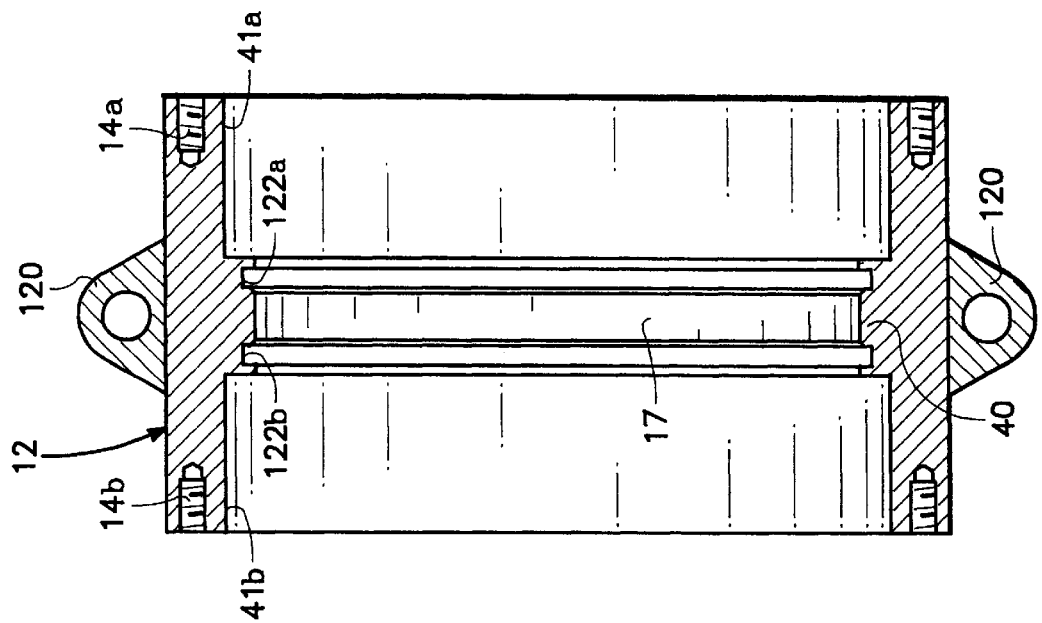
FIG. 4B is a side view of a cross section of the swivel shell of the swiveling hose coupling of a preferred embodiment of the present invention taken along line 4B—4B of FIG. 4A, which illustrates the design of the swivel shell.
Figure 4A:
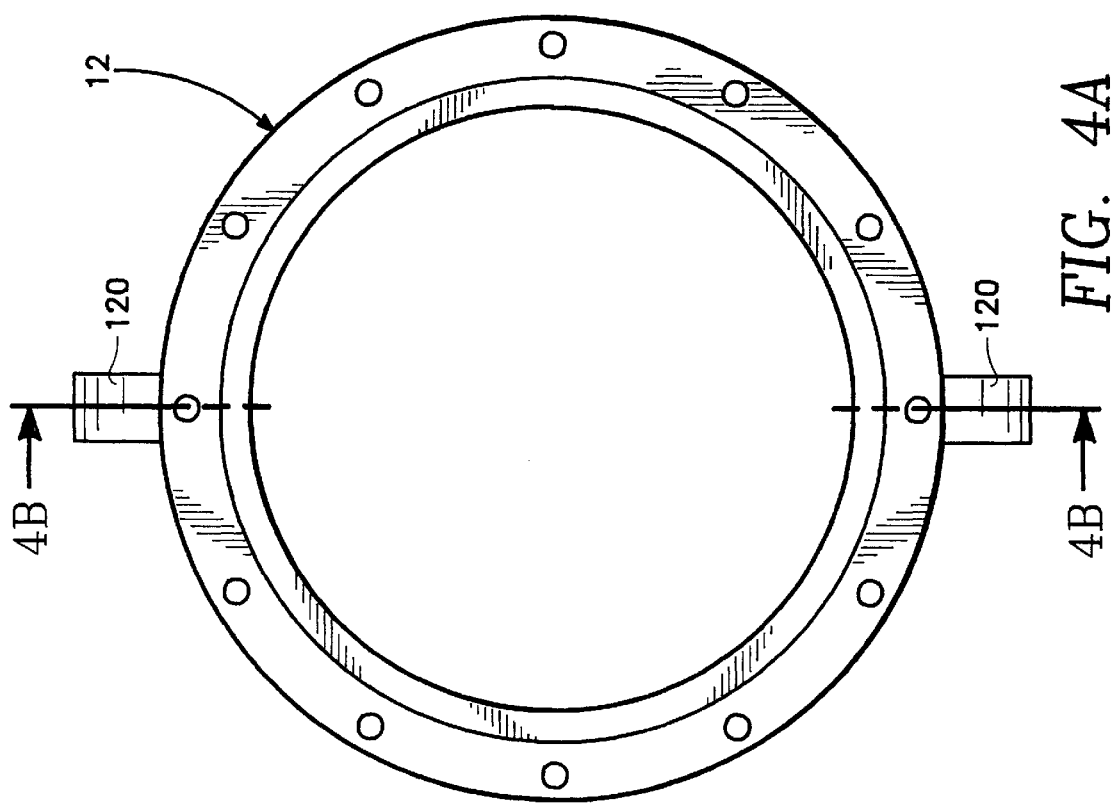
FIG. 4A is an end view of the swivel shell of the swiveling hose coupling of a preferred embodiment of the present invention
Figures 5A, 5B:
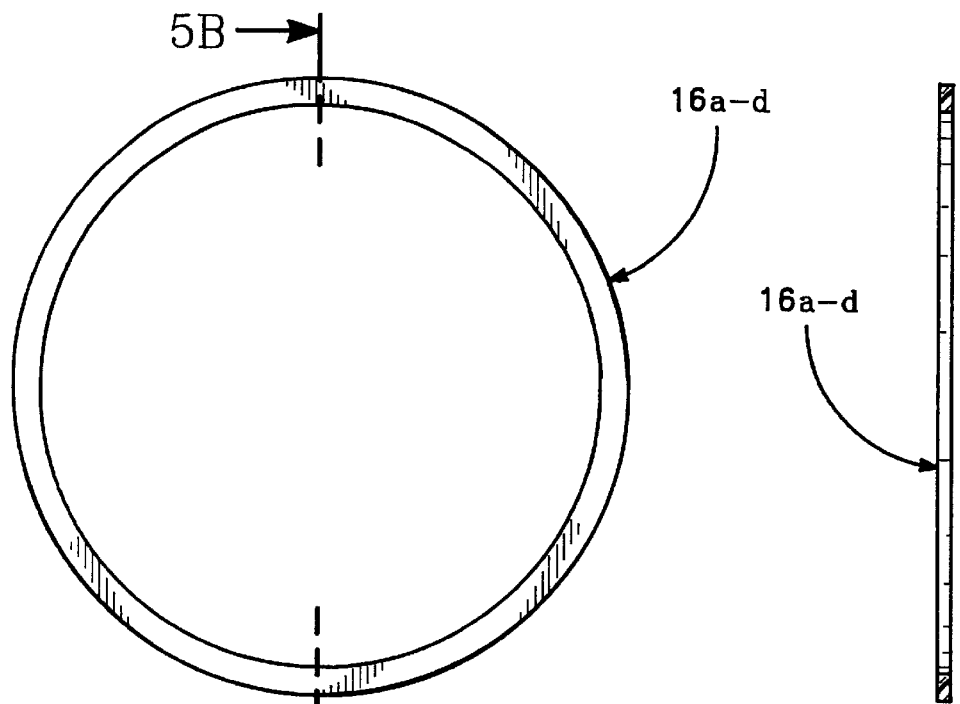
FIG. 5A is an end view of the thrust bearings of a preferred embodiment of the present invention
FIG. 5B is a side view of a cross section of the thrust bearings of the swiveling hose coupling of a preferred embodiment of the present invention taken along line 5B—5B of FIG. 5A, which illustrates the design of the thrust bearings.
Figures 6A, 6B:
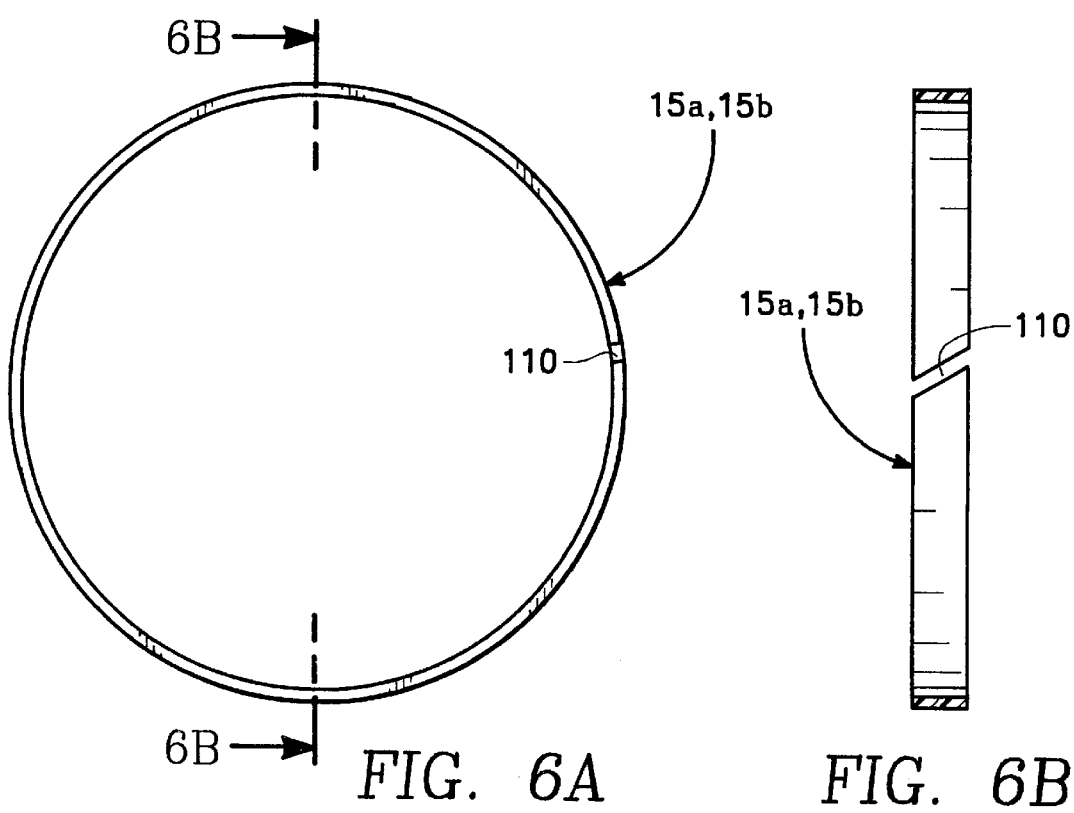
FIG. 6A is an end view of the journal bearings of the swiveling hose coupling of a preferred embodiment of the present invention
FIG. 6B is a side view of a cross section of the journal bearings of the swiveling hose coupling of a preferred embodiment of the present invention taken along line 6B—6B of FIG. 6A, which illustrates the design of the journal bearings.

Referring to FIGS. 1B and 5A through 6B, the antifriction bearings are, more specifically, circular journal bearings 15a and 15b each of which includes a relief cot 110 (FIG. 6B) and circular thrust bearings 16a, 16b, 16c and 16d located within the cylindrical shell 10. Journal bearings 15a and 15b are set into journal bearing grooves 21a and 21b on each of the first and second nipples 11a and 11b, as illustrated in FIGS. 1B and 2B. The journal bearings 15a and 15b reduce the friction between the outer sections 41a and 41b of the swivel shell 12 and the first and second nipples 11a and 11b, as illustrated in FIGS. 1B and 4B. A first set of thrust bearings 16c and 16d are set between a flange on the retaining rings 13a and 13b and the distal end of the journal bearing grooves 21a and 21b, as illustrated in FIGS. 1B and 2B. A second set of thrust bearings 16a and 16b are set between the swivel shell 12 and the proximate end of the journal bearing grooves 21a and 21b, as illustrated in FIGS. 1B and 2B. The terms distal and proximate are used with respect to the central point, approximately the center 17 of the cylindrical shell 10, of the first and second nipples 11a and 11b.

In a preferred embodiment of the present invention, referring to FIGS. 1B, 4B, 8A and 8B, fluid seals 18a and 18b are used keep fluids from leaking out of the hose line. The fluid seals 18a and 18b are set into fluid seal grooves 122a and 122b on the inner section 40 of the swivel shell 12 on both sides of the center portion 17 of the swivel shell 12, as illustrated in FIG. 4B. The fluid seals 18a and 18b are designed for relative motion between the sealing surfaces on the swivel shell 12 and the nipples 11a and 11b. Debris seals 19a and 19b are on the outer ends of the cylindrical shell 12 between the flanges 31a and 31b on the retaining rings 13a and 13b and the first and second nipples 11a and 11b. The debris seals 19a and 19b are set into debris seal grooves 121a and 121b on the retaining rings 13a and 13b, as illustrated in FIG. 3B. Debris seals 19a and 19b prevent dirt, grit or other contaminants from entering the bearing areas.

Figures 7A, 7B:
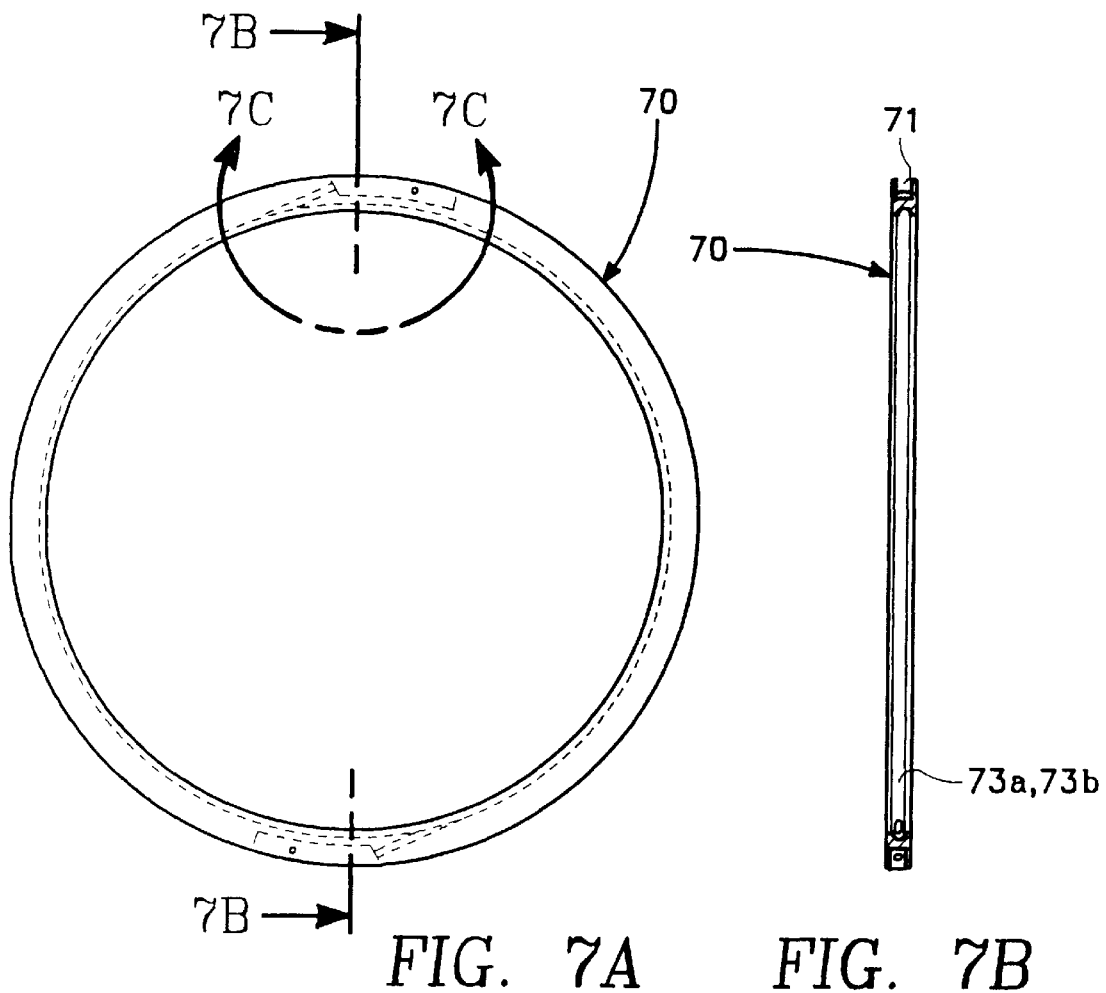
FIG. 7A is an end view of the indexing ring of the swiveling hose coupling of a preferred embodiment of the present invention.
FIG. 7B is a side view of a cross section of the indexing ring of the swiveling hose coupling of a preferred embodiment of the present invention taken along line 7B—7B of FIG. 7A, which illustrates the design of the indexing ring.
Figure 7C:
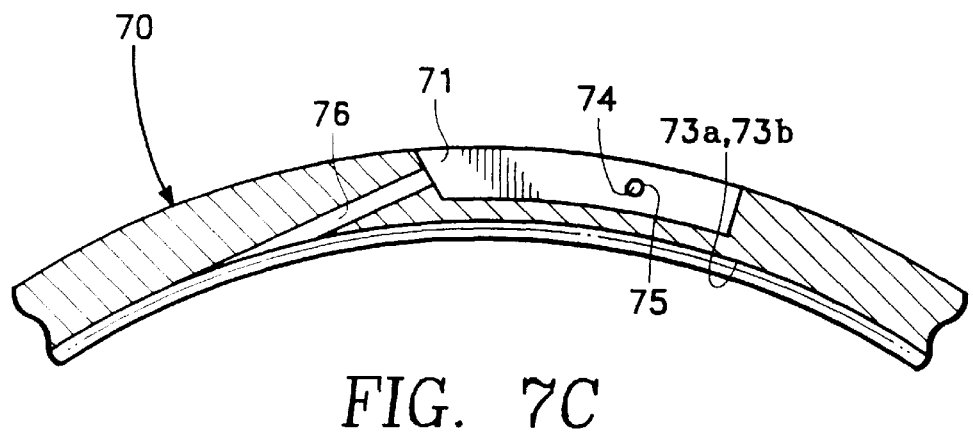
FIG. 7C is a magnified view of the opening on the indexing ring of the swiveling hose coupling of a preferred embodiment of the present invention taken along line 7C—7C, which illustrates the insertion point of the flexible shear rod.
Figures 8A, 8B:
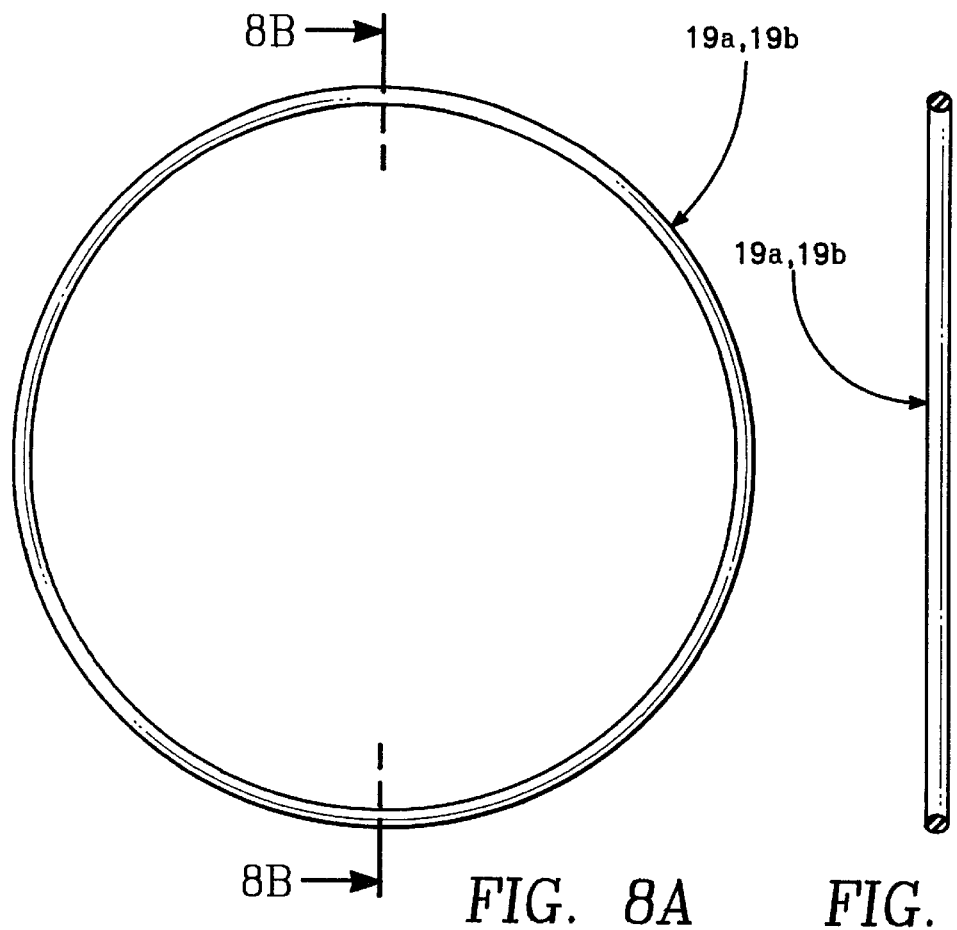
FIG. 8A is an end view of the debris seal and fluid seal of the swiveling hose coupling of a preferred embodiment of the present invention.
FIG. 8B is a side view of a cross section of the debris seal and fluid seal of the swiveling hose coupling of a preferred embodiment of the present invention taken along line 8B—8B of FIG. 8A, which illustrates design of the debris seal and fluid seal.
Figures 9A, 9B:
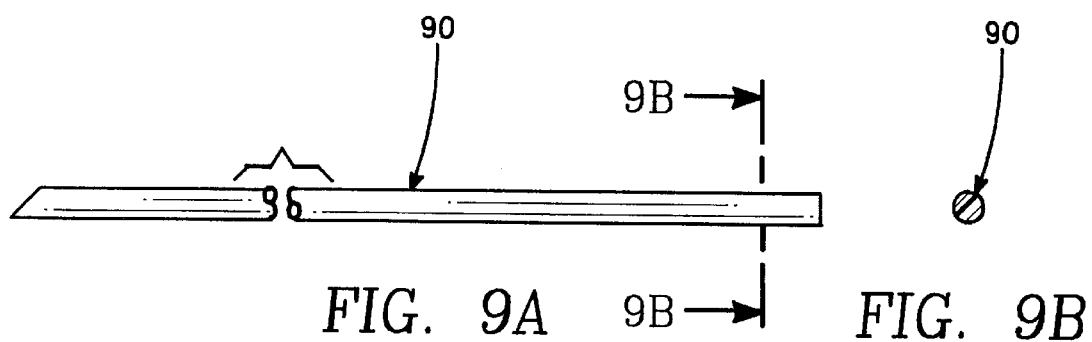
FIG. 9A is a side view of the flexible shear rod of the swiveling hose coupling of a preferred embodiment of the present invention.
FIG. 9B is a cross section of the flexible shear rod of the swiveling hose coupling of a preferred embodiment of the present invention taken along line 9B—9B of FIG. 9A.

In a preferred embodiment of the present invention, referring to FIGS. 1A, 1B and 2B, the cylindrical shell 12 is set into place on the nipples 11a and 11b between two identical circular indexing rings 70, which are inserted over the nipples 11a and 11b. Each indexing ring 70 serves as a reference point to attach a clamp 100, as illustrated in FIG. 10A. A clamp 100 has a groove so that it fits over the indexing rings 70. The swiveling hose coupling 1 of the present invention has an indexing ring 70 for the first nipple 11a and another indexing ring 70 for the second nipple 11b. Each indexing ring 70 has an inner circumference approximately equal to or slightly greater than the outer circumference of the nipples 11a and 11b. Referring to FIGS. 7A through 7C, each indexing ring 70 has an opening 71 and an insertion hole 76 to allow for the insertion of a flexible shear rod 90, illustrated in FIGS. 9A and 9B, between the indexing grooves 73a and 73b of the indexing rings 70 and the indexing grooves 72a and 72b. In a preferred embodiment of the present invention, the flexible shear rods 90 have a circular tube shape. The circular tube shape of rods 90 corresponds to indexing grooves 72a and 72b etched into each of the nipples 11a and 11b and the indexing grooves 73a and 73b to produce a secure fit. In other embodiments, the flexible shear rods 90 may use any shape that produces a secure fit in the indexing grooves.

Referring to FIGS. 1B and 2B, an o-ring 123a and 123b is set between each flange of the retaining rings 13a and 13b and the swivel shell 12. Each o-ring is set into a corresponding o-ring groove 124a and 124b, as illustrated in FIG. 3B.

Referring to FIGS. 1B, 2B, 7A, 7B and 7C, indexing grooves 72a and 72b are respectively located on the first and second nipples 11a and 11b. Each indexing ring 70 fits snugly over the respective indexing grooves 72a and 72b. Each of the indexing grooves 72a and 72b and indexing grooves 73a and 73b secures a flexible shear rod 90 flush against each of the respective nipples 11a and 11b. The length of the flexible shear rod 90 is approximately equal to or slightly less than the diameter of the nipple 11a or 11b at the indexing groove 72a or 72b and indexing grooves 73a and 73b. When the indexing ring 70 is placed around a nipple 11a or 11b, the indexing ring 70 is secured over indexing grooves 72a or 72b. The flexible shear rod 90 is lead into an opening 71 in the indexing ring and wrapped around the nipple 11a or 11b between the inner portion of the indexing ring 70, as illustrated in FIG. 7B, and the indexing groove 72a or 72b. The flexible shear rod 90 is lead into the space created between the indexing ring 70 and the indexing groove 72a or 72b until it comes in contact with a restrain wall inside the indexing ring 70. A jutting section of the flexible shear rod 90 is held in the opening 71 of the indexing ring 70 by a roll pin 75 inserted through holes 74 in the indexing ring. The roll pin 75 is inserted in a position essentially perpendicular to the plane of the indexing ring 70. The jutting section is used to remove the flexible shear rod 90 from the space created between the indexing ring 70 and the indexing groove 72a or 72b.

In a preferred embodiment of the present invention, an anchor pendant shackle 120 is attached to the outer section of the swivel shell 12, as illustrated in FIGS. 1A and 4B. The anchor pendant shackle 120 and anchor shackle 130 secures the swiveling hose coupling to an object, such as an anchor or chain, or an area, such as a sea floor. Each anchor shackle 130 is secured to its associated anchor pendant shackle shackle 120 by a shackle pin 131 in the manner illustrated in illustrated in FIG. 1A.

In a preferred embodiment of the present invention, the hose coupling disclosed in U.S. Pat. No. 4,593,942 (hereinafter "'942 Patent") issued to Lokar on Jun. 10, 1986 is used in conjunction the swiveling hose coupling of the present invention to better describe the novelty of the present invention. The '942 Patent is incorporated herein by reference. Referring to FIGS. 1B and 2B, the clamp grooves on the nipples 11a and 11b correspond to clamp grooves necessary for using the hose coupling of the '942 Patent. However, the incorporation of the hose coupling of the '942 Patent does not limit the applications of the swiveling hose coupling of the present invention. Hose couplings which are similar in design to the hose coupling of the '942 Patent may be used with the present invention with the proper modifications. Examples of other usable hose coupling are disclosed in U.S. Pat. No. 5,306,051 issued to Lokar et al. on Apr. 26, 1994 and U.S. Pat. No. 4,758,029 issued to Davis on Jul. 19, 1988.

The swiveling hose coupling 1 of the present invention is used to reliably secure sections of hose for the transfer of fluids. When undersea currents or other forces cause a hose line to twist, fluid flow is restricted. This restriction leads to damage to the hose line and loss of time and man hours to align the hose correctly. By utilizing the swiveling hose coupling 1, this restriction is averted when a nipple 11a and/or 11b of the swiveling hose coupling 1 rotates as the force or current bears against the various sections of hose. In addition, the swiveling hose coupling 1, is a valuable tool to correct twisting caused by human interaction, when manually carrying the hose through various areas, such as surf.

Although the description above contains much specificity, these should not be construed as limiting the scope of the invention but as merely providing an illustration of the presently preferred embodiment of the invention. Thus the scope of this invention should be determined by the appended claims and their legal equivalents.

What is claimed is:

1. A swiveling hose coupling comprising:
    a tubular cylindrical shell comprising a swivel shell having an inner end and an outer end secured between a first retaining ring having an inner flange and a second retaining ring having an inner flange;
    a tubular first nipple having a journal bearing groove and a tubular second nipple having a journal bearing groove, wherein said first nipple is secured in said cylindrical shell by setting the journal bearing groove of said first nipple between the inner flange of said first retaining ring and said swivel shell and said second nipple is secured in said cylindrical shell by setting the journal bearing groove of said second nipple between the inner flange of said second retaining ring and said swivel shell;
    means for locking said swivel shell between said first retaining ring and said second retaining ring;
    a circular first thrust bearing and a circular second thrust bearing, wherein said first thrust bearing is set flush between the journal bearing groove of said first nipple and said swivel shell and said second thrust bearing is set flush between the journal bearing groove of said second nipple and said swivel shell;
    a circular third thrust bearing and a circular forth thrust bearing, wherein said third thrust bearing is set flush between the inner flange of said first retaining ring and the journal bearing groove of said first nipple and said forth thrust bearing is set flush between the inner flange of said second retaining ring and the journal bearing groove of said second nipple;
    a circular first journal bearing and a circular second journal bearing, wherein said first journal bearing is set into the journal bearing groove of said first nipple and said second journal bearing is set into the journal bearing groove of said second nipple;
    wherein each of said first and second nipples is able to rotate independent of one another within said cylindrical shell; and
    a circular first fluid seal and a circular second fluid seal, wherein said first fluid seal is set around said first nipple into a first fluid seal groove in the inner end of said swivel shell and said second fluid seal is set around said second nipple into a second fluid seal groove in the inner end of said swivel shell.

2. The swiveling hose coupling of claim 1, further comprising;
    at least one anchor pendent secured to the outer end of said swivel shell.

3. The swiveling hose coupling of claim 1, wherein each of said first and second journal bearings and each of said first, second, third and forth thrust bearings are constructed of an antifriction surface.

4. The swiveling hose coupling of claim 3, wherein said antifriction surface is TEFLON®.

5. A swiveling hose coupling comprising:
   a tubular cylindrical shell comprising a swivel shell having an inner end and an outer end secured between a first retaining ring having an inner flange and a second retaining ring having an inner flange;
   a tubular first nipple having a journal bearing groove and a tubular second nipple having a journal bearing groove, wherein said first nipple is secured in said cylindrical shell by setting the journal bearing groove of said first nipple between the inner flange of said first retaining ring and said swivel shell and said second nipple is secured in said cylindrical shell by setting the journal bearing groove of said second nipple between the inner flange of said second retaining ring and said swivel shell;
   means for locking said swivel shell between said first retaining ring and said second retaining ring;
   a circular first thrust bearing and a circular second thrust bearing, wherein said first thrust bearing is set flush between the journal bearing groove of said first nipple and said swivel shell and said second thrust bearing is set flush between the journal bearing groove of said second nipple and said swivel shell;
   a circular third thrust bearing and a circular forth thrust bearing, wherein said third thrust bearing is set flush between the inner flange of said first retaining ring and the journal bearing groove of said first nipple and said forth thrust bearing is set flush between the inner flange of said second retaining ring and the journal bearing groove of said second nipple;
   a circular first journal bearing and a circular second journal bearing, wherein said first journal bearing is set into the journal bearing groove of said first nipple and said second journal bearing is set into the journal bearing groove of said second nipple;
   wherein each of said first and second nipples is able to rotate independent of one another within said cylindrical shell; and
   a circular first debris seal and a circular second debris seal, wherein said first debris seal is set around said first nipple into a first debris seal groove in the inner end of said swivel shell and said second debris seal is set around said second nipple into a second debris seal groove in the inner end of said swivel shell.

6. The swiveling hose coupling of claim 5, further comprising:
   at least one anchor pendent secured to the outer end of said swivel shell.

7. The swiveling hose coupling of claim 5, further comprising;
   a circular first indexing ring and a circular second indexing ring, wherein said first indexing ring is secured over an indexing groove on said first nipple and said second indexing ring is secured over an indexing groove on said second nipple;
   wherein each of said first and second indexing rings are a reference point for applying a clamp after an end of a first hose is positioned over said first nipple and an end of a second hose is positioned over said second nipple.

8. The swiveling hose coupling of claim 5, wherein each of said first and second journal bearings and each of said first, second, third and forth thrust bearings are constructed of an antifriction surface.

9. The swiveling hose coupling of claim 8, wherein said antifriction surface is TEFLON®.

10. A swiveling hose coupling comprising:
    a tubular cylindrical shell comprising a swivel shell having an inner end and an outer end secured between a first retaining ring having an inner flange and a second retaining ring having an inner flange;
    a tubular first nipple having a journal bearing groove and a tubular second nipple having a journal bearing groove, wherein said first nipple is secured in said cylindrical shell by setting the journal bearing groove of said first nipple between the inner flange of said first retaining ring and said swivel shell and said second nipple is secured in said cylindrical shell by setting the journal bearing groove of said second nipple between the inner flange of said second retaining ring and said swivel shell;
    means for locking said swivel shell between said first retaining ring and said second retaining ring;
    a circular first thrust bearing and a circular second thrust bearing, wherein said first thrust bearing is set flush between the journal bearing groove of said first nipple and said swivel shell and said second thrust bearing is set flush between the journal bearing groove of said second nipple and said swivel shell;
    a circular third thrust bearing and a circular forth thrust bearing, wherein said third thrust bearing is set flush between the inner flange of said first retaining ring and the journal bearing groove of said first nipple and said forth thrust bearing is set flush between the inner flange of said second retaining ring and the journal bearing groove of said second nipple;
    a circular first journal bearing and a circular second journal bearing, wherein said first journal bearing is set into the journal bearing groove of said first nipple and said second journal bearing is set into the journal bearing groove of said second nipple;
    wherein each of said first and second nipples is able to rotate independent of one another within said cylindrical shell; and
    a circular first indexing ring and a circular second indexing ring, wherein said first indexing ring is secured over an indexing groove on said first nipple and said second indexing ring is secured over an indexing groove on said second nipple;
    wherein each of said first and second indexing rings are a reference point for applying a clamp after an end of a first hose is positioned over said first nipple and an end of a second hose is positioned over said second nipple.

11. The swiveling hose coupling of claim 10, further comprising:
    at least one anchor pendent secured to the outer end of said swivel shell.

12. The swiveling hose coupling of claim 1, wherein each of said first and second journal bearings and each of said first, second, third and forth thrust bearings are constructed of an antifriction surface.

13. The swiveling hose coupling of claim 12, wherein said antifriction surface is TEFLON®.

\* \* \* \* \*